Figure 3:
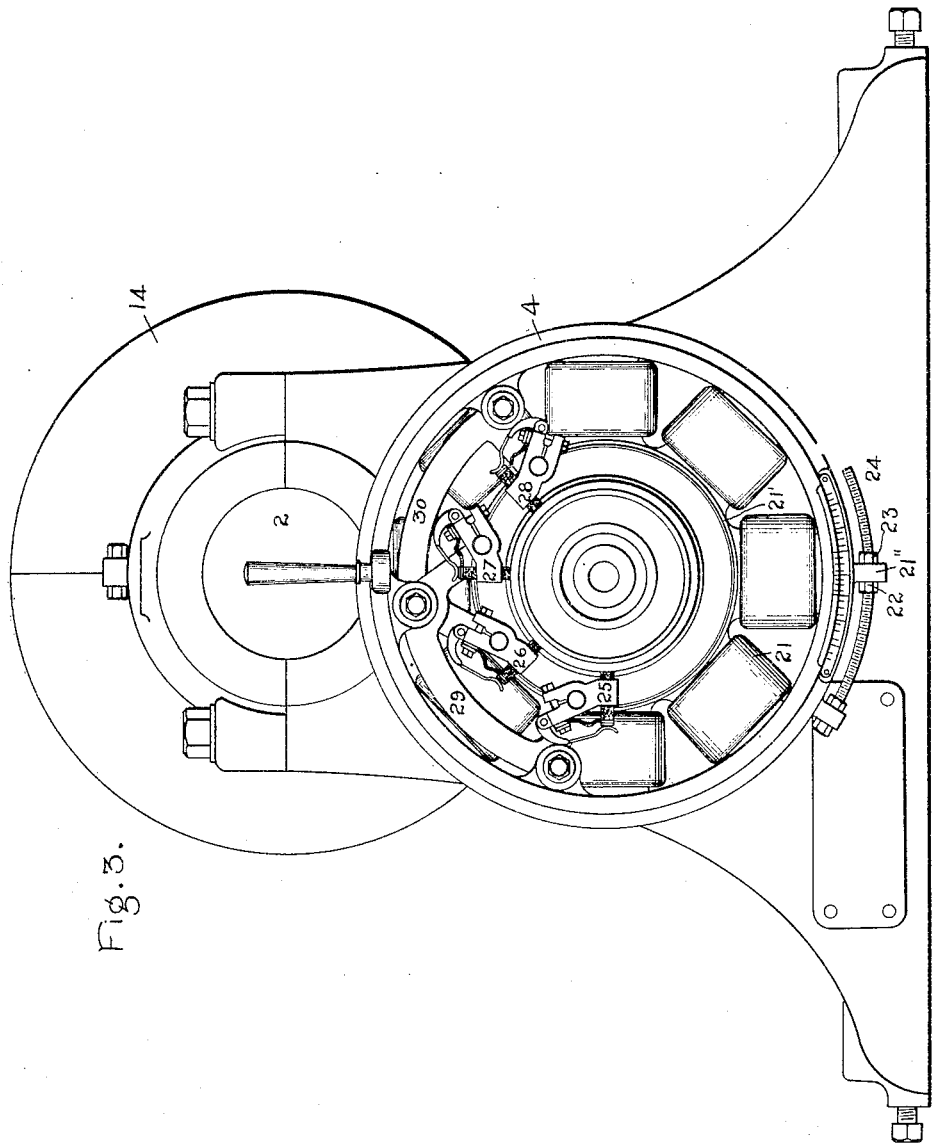

No. 775,857. PATENTED NOV. 22, 1904.
H. G. REIST.
DYNAMO ELECTRIC MACHINERY.
APPLICATION FILED MAY 18, 1903.
NO MODEL. 2 SHEETS—SHEET 1.
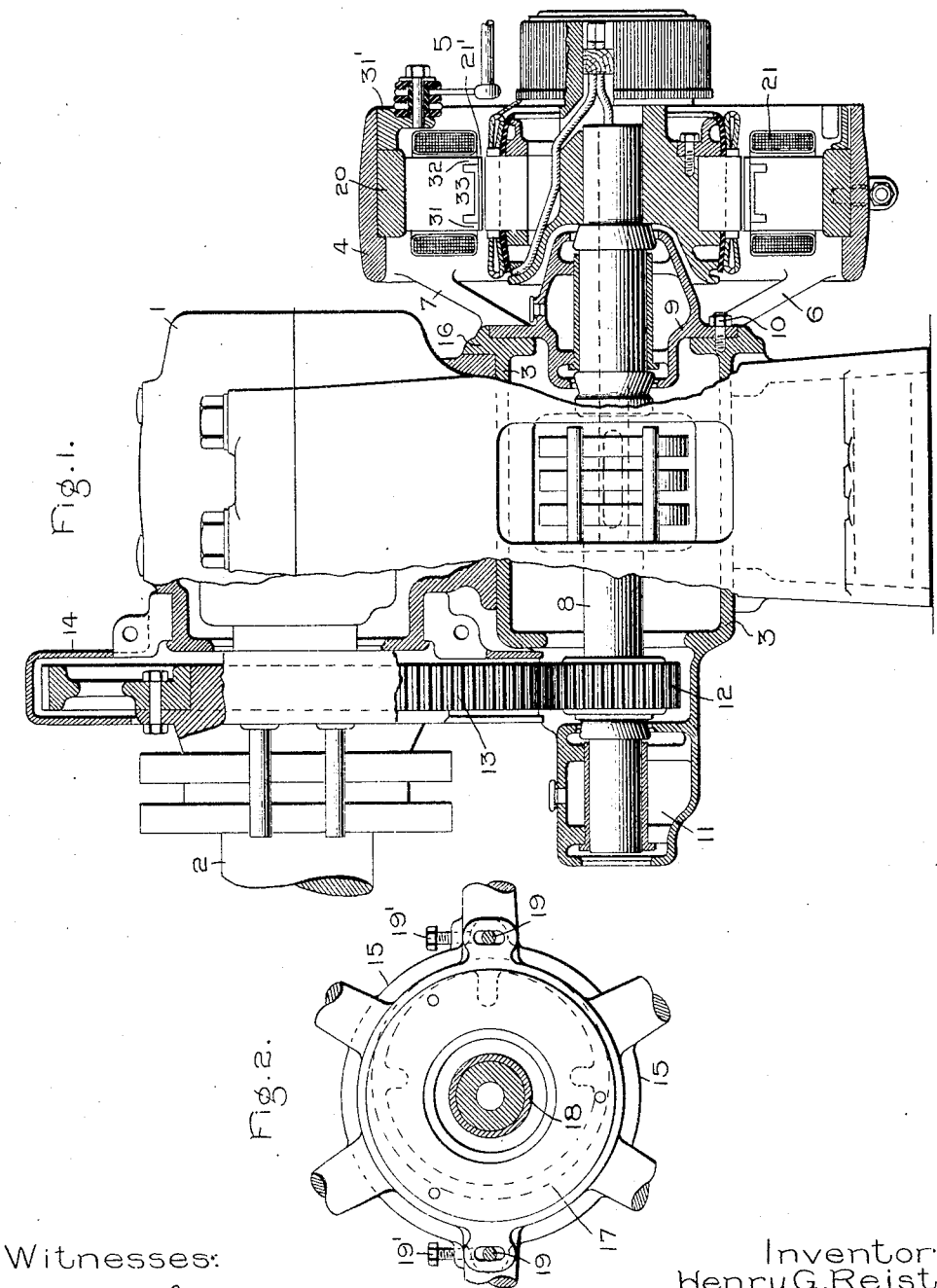
Witnesses:
Marcus L. Byng.
Helen Orford
Inventor:
Henry G. Reist,
by Allen H. Davis
Att'y.

No. 775,857.    Patented November 22, 1904.

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

DYNAMO-ELECTRIC MACHINERY.

SPECIFICATION forming part of Letters Patent No. 775,857, dated November 22, 1904.

Original application filed May 9, 1902, Serial No. 106,573. Divided and this application filed May 18, 1903. Serial No. 157,556.

(No model.)

*To all whom it may concern:*

Be it known that I, HENRY G. REIST, a citizen of the United States, residing at Schenectady, county of Schenectady, State of New York, have invented certain new and useful Improvements in Dynamo-Electric Machinery, (division of my prior application, Serial No. 106,573, filed May 9, 1902,) of which the following is a specification.

My present invention relates to certain improvements in the construction and mounting of dynamo-electric machines, the novel features of which are particularly pointed out in the appended claims. The invention is capable of various applications, but is hereinafter set forth, for purposes of illustration, in connection with an exciter for a dynamo-electric machine of that type now commonly known in the art as a "compensated" alternator, wherein current from the alternator is conveyed either directly or inductively to the exciter-armature, which current thus conveyed operates to vary the armature reaction of the exciter in such manner as to compensate for variations of the load and power factor of the main generator or alternator.

In the drawings I have not considered it necessary to illustrate the main alternator, but have shown merely one of its main bearings or pillow-blocks, in connection with which the exciter for the alternator is mounted.

Figure 1 is a view, partly in section, of an exciter arranged in accordance with my invention on one of the pillow-blocks of the main alternator. (Not shown.) Fig. 2 is a detail, and Fig. 3 is an end view of so much of the machine as is represented in Fig. 1.

In Fig. 1 the pillow-block of the main alternator is represented at 1 and the main shaft carried by the pillow-block at 2, this shaft being represented in end view at 2 in Fig. 3. The pillow-block is formed with a circular opening directly below the main bearing, and in this opening is mounted a hollow cylinder or sleeve 3, which is cast integral with but eccentric to the ring-shaped supporting frame or yoke 4 of the exciter. (Represented generally at 5.) Radial arms, such as 6 and 7, serve to connect the sleeve 3 with the ring-like member 4 and, as has been before mentioned, are cast integral with the sleeve and the ring-like member.

The shaft of the exciter is represented at 8 and is carried in bearings mounted in the respective ends of the cylindrical member 3. The main bearing is represented at 9 and is separable from the sleeve 3 and is held in position by bolts or other securing means, one of which bolts is represented at 10. The support for the other or outer bearing of the shaft 8 is formed integral with the sleeve 3 and is represented at 11.

The exciter-shaft carries a pinion 12, which meshes with a driving-gear 13, mounted on the main shaft 2 of the main machine. The pinion is inclosed within the casing supporting the exciter-shaft, while the driving-gear 13 is similarly inclosed by means of a gear-casing 14.

To enable the driving-gear and its pinion to be adjusted relatively to each other, the cylinder 3 is cast so that its axis is displaced laterally from the axis of the shaft 8, which latter axis of course is central with respect to the ring-shaped field-magnet support or yoke 4. This is represented perhaps best in Fig. 2, in which a bounding-line 15 represents the circumference of the flange 16 formed on the cylinder 3. The dotted circle 17, displaced eccentrically with respect to the circumference 15, represents the outer surface of the cylinder 3, while the small circle 18, concentric with the circumference 15, indicates the shaft 8, which, as will be seen, is of course eccentric with respect to the axis of the cylinder 3. If this cylinder be rotated slightly in its bearings, it is obvious that the shaft 8 will rise or fall in space, as the case may be, thereby permitting the pinion 12, carried by the shaft, to be adjusted to or from the driving-gear 13 by the adjusting-screws 19', as may be required. After suitable adjustment is secured the movable structure, including the sleeve 3 and parts carried thereby, is clamped in place by means of set-screws 19.

The ring-shaped member 4 forms the mechanical support for the field-magnet structure proper of the exciter, this structure consisting of a ring 20, provided with a number of pole-pieces upon which are mounted the usual field-coils, as indicated at 21 in Fig. 3. The pole-faces of the pole-piece are joined by a ring of magnetic material 21' in order to secure a somewhat more uniform transition of flux about the surface of the exciter-armature.

The ring or yoke 20, carrying the pole-pieces, is adjusted within its supporting member 4, so as to enable the pole-pieces to be adjusted around the exciter-armature, for purposes well understood in connection with this class of machine. To secure this adjustment conveniently, a lug 21'', connected to the yoke 20, extends downward and is arranged to engage adjusting-nuts 22 23 on a screw-threaded rod 24, secured at one end to the supporting-frame 4. By suitably adjusting these nuts in an obvious manner the field structure of the exciter may be adjusted about the exciter-armature.

The brush-holders 25 to 28 are arranged so that those of like polarity are supported from a brush-holder yoke formed of a somewhat bow-shaped piece of metal, such as at 29 or 30. Each brush-holder yoke is mechanically secured to but insulated from a ring 31', movable within the field-frame 4, and serves the double function of a mechanical support for and electrical connection between brush-holders of like polarity.

What I claim as new, and desire to secure by Letters Patent of the United States, is—

1. The combination of a main shaft, a dynamo-electric machine the shaft of which is geared to said main shaft, and a rotatably-mounted support for said machine arranged with its axis of rotation eccentric with respect to the shaft of said machine whereby the distance between the shafts can be varied and the angular relation between the field of said machine and its armature can be altered by rotating said support.

2. The combination of a dynamo-electric machine, a rotatably-mounted support therefor arranged with its axis of rotation eccentric with respect to the axis of rotation of the rotating member of said dynamo-electric machine, and means for rotating the field of said machine with respect to said support.

3. The combination of a main shaft, a pillow-block for said shaft, a dynamo-electric machine carried by said pillow-block, gears carried respectively by said shaft and the rotating member of said dynamo-electric machine, and means for adjusting said gears relatively to each other, and means for adjusting the field of said dynamo-electric machine angularly with respect to its armature.

4. The combination of a main shaft, a pillow-block for said shaft, a dynamo-electric machine carried by a member rotatably mounted in said pillow-block and arranged so that its shaft is eccentric with respect to the axis of rotation of said member, a gear carried by said main shaft, and a pinion carried by the shaft of said dynamo-electric machine and adapted to engage said gear.

5. The combination of a main shaft, a pillow-block for said shaft, a dynamo-electric machine carried by a member rotatably mounted in said pillow-block and arranged so that its shaft is eccentric with respect to the axis of rotation of said member, a gear carried by said main shaft, a pinion carried by the shaft of said dynamo-electric machine and adapted to engage said gear, and means for adjusting the field of said machine angularly with respect to said member.

6. In combination, the shaft of a main dynamo-electric machine, an auxiliary dynamo-electric machine provided with a shaft operatively connected to the first-mentioned shaft, a support for the auxiliary machine eccentrically mounted with respect to its shaft whereby the distance between the two shafts may be varied by rotating the support, and means allowing a rotation of the field of said auxiliary machine with respect to its shaft and to said support.

In witness whereof I have hereunto set my hand this 16th day of May, 1903.

HENRY G. REIST.

Witnesses:
 EDWARD WILLIAMS, Jr.,
 MARCUS L. BYNG.